US012761995B2

(12) United States Patent
Atta et al.

(10) Patent No.: US 12,761,995 B2
(45) Date of Patent: Oct. 13, 2026

(54) INFORMATION HANDLING SYSTEM WITH A MECHANISM TO OFFLOAD CONTEXTUAL SENSING DATA

(71) Applicant: DELL PRODUCTS L.P., Round Rock, TX (US)

(72) Inventors: Venkata Rama Krishna Rao Atta, Hyderabad (IN); Ibrahim Sayyed, Georgetown, TX (US); Adolfo S. Montero, Pflugerville, TX (US); Marcin Nowak, Prosper, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/046,192

(22) Filed: Feb. 5, 2025

(65) Prior Publication Data

US 2026/0228075 A1 Aug. 6, 2026

(51) Int. Cl.
*G06F 11/07* (2006.01)
*G06F 11/30* (2006.01)

(52) U.S. Cl.
CPC ...... *G06F 11/0766* (2013.01); *G06F 11/3051* (2013.01)

(58) Field of Classification Search
CPC .......................... G06F 11/0766; G06F 11/3051
See application file for complete search history.

(56) References Cited

U.S. PATENT DOCUMENTS

2007/0300027 A1* 12/2007 Ali ...................... G06F 11/2087 711/162
2018/0246552 A1* 8/2018 Thompson .......... G06F 11/3093
2021/0334027 A1* 10/2021 Zaretsky ................ G06N 20/00
2023/0315595 A1 10/2023 Sayyed et al.
2024/0330135 A1 10/2024 Suryanarayana et al.

* cited by examiner

*Primary Examiner* — Ashish Thomas
*Assistant Examiner* — Kayo Lisa Rusin
(74) *Attorney, Agent, or Firm* — Larson Newman, LLP

(57) ABSTRACT

An information handling system includes a sensor hub and an embedded controller. The sensor hub collects sensing data associated with the information handling system. The embedded controller receives a power state for the information handling system. The system receives a trigger event notification from the sensor hub. In response to the trigger event notification, the system generates a contextual data set, wherein the contextual data set includes first data associated with the power state and the sensing data associated with a trigger event. The system also stores the contextual data set in a memory. The contextual data set is utilized during a no-post/no-video situation in the information handling system.

20 Claims, 3 Drawing Sheets

100

INFORMATION HANDLING SYSTEM WITH A MECHANISM TO OFFLOAD CONTEXTUAL SENSING DATA

FIELD OF THE DISCLOSURE

The present disclosure generally relates to information handling systems, and more particularly relates to an information handling system with a mechanism to offload contextual sensing data.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a sensor hub and an embedded controller. The sensor hub may collect sensing data associated with the information handling system. The embedded controller may receive a power state for the information handling system. The system may receive a trigger event notification from the sensor hub. In response to the trigger event notification, the system may generate a contextual data set that may include first data associated with the power state and the sensing data associated with a trigger event. The system also may store the contextual data set in a memory. The contextual data set may be utilized during a no-post/no-video situation in the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
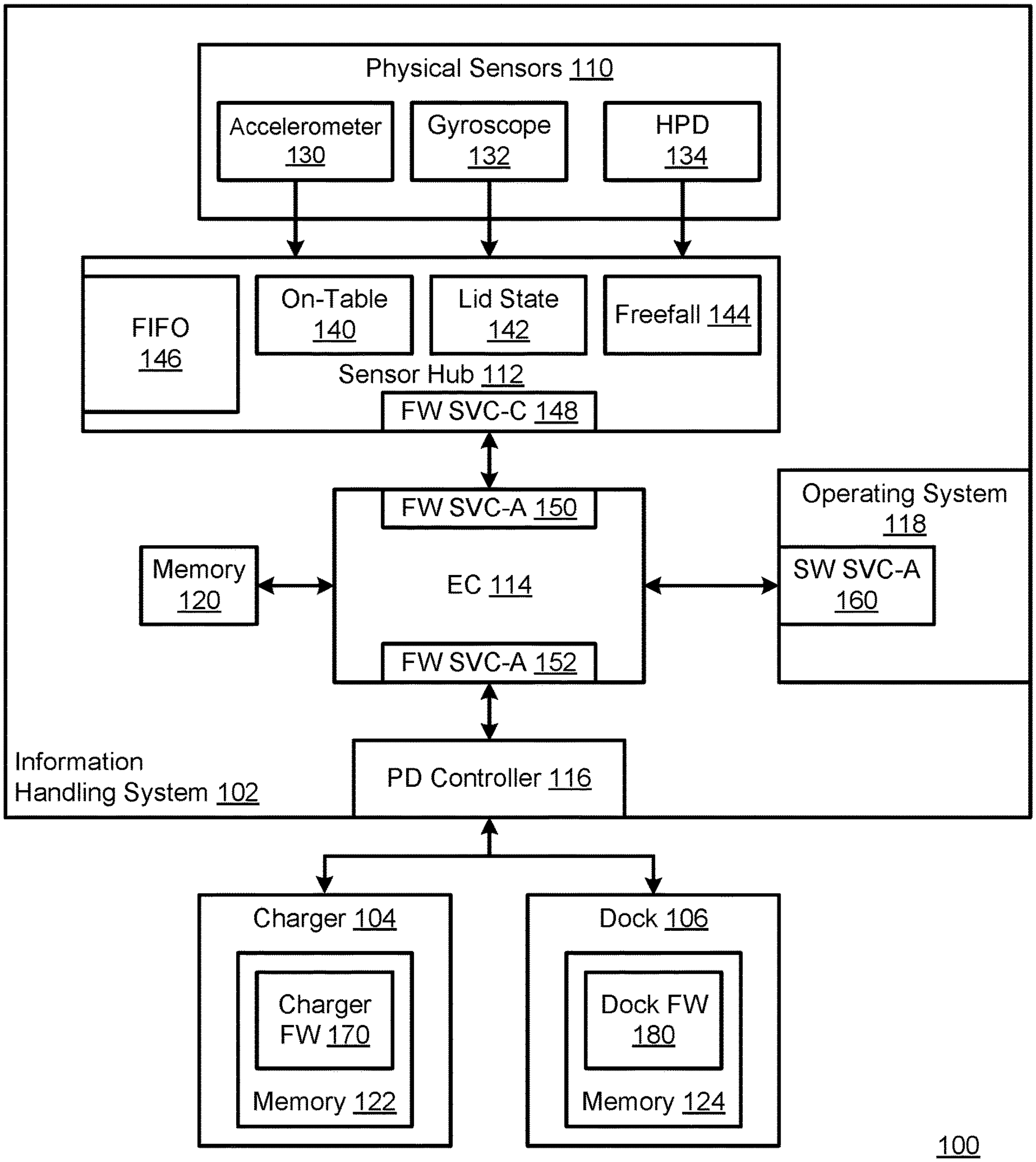
FIG. 1 is a block diagram of portion of a system including an information handling system, a charger, and a dock according to at least one embodiment of the present disclosure.

FIG. 1 illustrates a portion of a system 100 including an information handling system 102, a charger 104, and a dock 106 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 102 includes physical sensors 110, a sensor hub 112, a processor 114, a power delivery controller 116, an operating system 118, and a memory 120. In an example, processor 114 may be any suitable compute resource, such as an embedded controller and will be referred to herein as embedded controller 114. Charger 104 includes a memory 122 and dock 106 includes a memory 124. Physical sensors 110 may include, but are not limited to, an accelerometer 130, a gyroscope 132, and a human presence detection (HPD) component 134. Sensor hub 112 includes multiple detection modules or components, such as an on-table detection module 140, a lid state detection module 142, a freefall detection module 144, or the like. Sensor hub 112 also includes a buffer, such as a first-in first-out (FIFO) buffer 146, and a firmware service 148. In an example, firmware server 148 may be a driver to enable communication between sensor hub 112 and embedded controller 114. Information handling system 102 may include additional components without varying from the scope of this disclosure. Similarly, charger 104 and dock 106 also may include additional components without varying from the scope of this disclosure.

Embedded controller 114 includes multiple FW drivers, such as FW services 150 and 152, and these drivers may enable the embedded controller to communicate with other components of the information handling system 100. While FW services 150 and 152 have been labeled with different reference numbers, the FW services may be the same service or driver without varying from the scope of this disclosure. OS 118 includes a software service or driver 160. In an example, operating system 118 may be executed by any suitable processor, such as processor 302 or 304 of FIG. 3.

During execution of information handling system 102, the information handling system may receive power from charger 104 while in a lid-closed state. In this situation, sensor hub 112, via lid state module 142, may determine that information handling system is in the lid-closed state. While in this state, information handling system 102 may enter a sleep state or MODS and driver 160 of operating system 118 may provide this power state to embedded controller 114. In an example, freefall detection module 144 may detect a freefall of information handling system 102 with a high shock impact. In certain examples, the high shock impact may be determined by a combination of accelerometer 130 and gyroscope 132 and these components may provide an indication of shock event to sensor hub 112. In an example, sensor hub 112, via drivers 148 150, may provide the identification of the shock event to embedded controller 114.

In certain examples, the shock event may cause information handling system 102 to shutdown. After the shutdown forced by the shock event, information handling system 102 may attempt a reboot. However, during the attempted reboot, information handling system 102 may encounter a NO-POST and NO-VIDEO (NP-NV) situation. While in a NP-NV situation, previous information handling systems fail to detect the system state and do not have the ability to retrieve and store critical contextual sensing data. Based on the failures in previous information handling system, these systems have gaps in debugging and root cause analysis, which may result in a higher No Fault Found (NFF) rate. Information handling system 102 may be improved by embedded controller 114 collecting or generating contextual data in response to the occurrence of a particular event while information handling system is in the MODS. Additionally, information handling system 102 may be improved by embedded controller 114 storing the contextual data in a memory for later access during a system debug situation.

During operation of information handling system 102, driver 160 of operating system 118 may provide both power state data and thermal state data for the system to embedded controller 114. In certain examples, the power state data may indicate when information handling system 102 transitions between power states, such as S0, S1-S3, S4, S5, and modern standby (MODS). The thermal state data may provide updated information on changes to the thermal state of information handling system 102. In an example, embedded controller 114 may record when information handling system 102 has entered into MODS.

When information handling system 102 enters the MODS, embedded controller 114 may monitor sensing data that has been collected or determined by sensing hub 112. This sensing data may include information such as lid state 142, walk-away detection from HPD 134, on-table detection 140, and system freefall events 144 and shock events. In an example, the sensing data may be determined from any suitable sources, such as accelerometer 130, gyroscope 132, HPD 134, components 140, 142, and 144 of sensor hub 112, or the like. While it is described that embedded controller 114 monitors the sensing data while information handling system 102 is in MODS, the embedded controller may monitor the sensing data at any particular time without varying from the scope of this disclosure.

In certain examples, driver 148 may monitor sensor hub 112 and provide data to embedded controller 114 via driver 150. In an example, embedded controller 114 may receive the sensing data from sensor hub 112 over a communication channel, such as a sideband communication channel. In certain examples, communication channel between sensor hub 112 may be any suitable type of communication channel, such as an Inter-Integrated Circuit (I2C) communication channel.

In an example, embedded controller 114 may monitor the sensing data for different events that may cause an unknown state to occur while information handling system 100 is in MODS. In certain examples, these different events may be shock or impact events detected by accelerometer 130 and gyroscope 132, freefall events 144, or the like. In response to an event being detected, embedded controller 114 may collect all sensing data generated during the detected event. In an example, the sensing data may include physical states of information handling system 102. For example, the physical states may include, but are not limited to, on-table detection 140, lid state 142, freefall detection 144, and human presence. While it is described that embedded controller 114 retrieves the sensing data in response to the trigger event, the embedded controller may manage sensor hub 112 and continuously receive the sensing data without varying from the scope of this disclosure.

Based on the collected sensing data, embedded controller 114 may generate a contextual data set associated with the sensing data and a power state of information handling system 102 when the event occurred. In an example, while information handling system 102 is in the MODS state, the detected event may cause the information handling system to enter an unknown state and prevent the information handling system from booting properly. For example, during a boot attempt after the detected event, information handling system 102 may enter a NP-NV situation or state. When information handling system 102 enters the NP-NV state, the contextual data is needed to determine or characterize the conditions that caused this state.

In response to the contextual data set being generated, embedded controller 114 may determine whether the side band communication path is available to enable the embedded controller to provide the contextual data set to a cloud server associated with information handling system 102. In an example, the communication path, if available, may be available over a wireless wide area network (WWAN), a dock connectivity interface, or the like. If the communication path to enable the contextual data set to be sent to the cloud server is available, embedded controller 114 may provide the contextual data to the cloud server. The contextual data set may be stored for later usage by an information technology (IT) administrator associated with information handling system 102 to determine a root cause of the boot error.

If the communication path between information handling system 102 and the cloud server is not available, embedded controller 114 may perform one or more operations to store the contextual data in one or more of memories 120, 122, and 124. In an example, embedded controller 114 may determine whether a side band communication path is available between information handling system 102 and one or more connected devices. In an example, the connected devices may be charger 104, dock 106, or the like. In certain examples, the side band communication path may be any suitable type, such as the configuration channel (CC) line of a universal serial bus (USB) type-C connection. If the side band communication path is available, embedded controller 114 may utilize PD controller 116 to provide the contextual data set to one or more of the external connected devices, such as charger 104 and dock 106. After receiving the contextual data, firmware 170 of charger 104 may store the data in memory 122. Similarly, if the contextual data is received at dock 106, firmware 180 may store the data in memory 124.

If the side band communication path is not available between information handling system 102 and at least one of charger 104 and dock 106, embedded controller 114 may identify memory 120 within the information handling system to store the contextual data. In an example, memory 120 may be located at any suitable location within information handling system 102 that is accessible to embedded controller 114. For example, memory 120 may be a serial peripheral interface (SPI) memory external to, but in electrical communication with, embedded controller 114. In an example, memory 120 may be internal to embedded controller 114. In response to memory 120 being identified, embedded controller 114 may store the contextual data set in the memory. In certain examples, the contextual data may be stored in one of memories 120, 122, and 124 for later stage retrieval once data is requested over any side band interfaces.

In an example, if an on-board recovery solution is able to successful recover information handling system 102 from the NP-NV state, embedded controller 114 may retain the contextual data as telemetry entry as a root cause of the issue. However, if the on-board recovery solution is able to successfully recover information handling system 102 from the NP-NV state, a service center repair tool may fetch the contextual data from memory 120, 122, or 124 and use this data while performing a root cause analysis for the reported failure.

Figure 2:
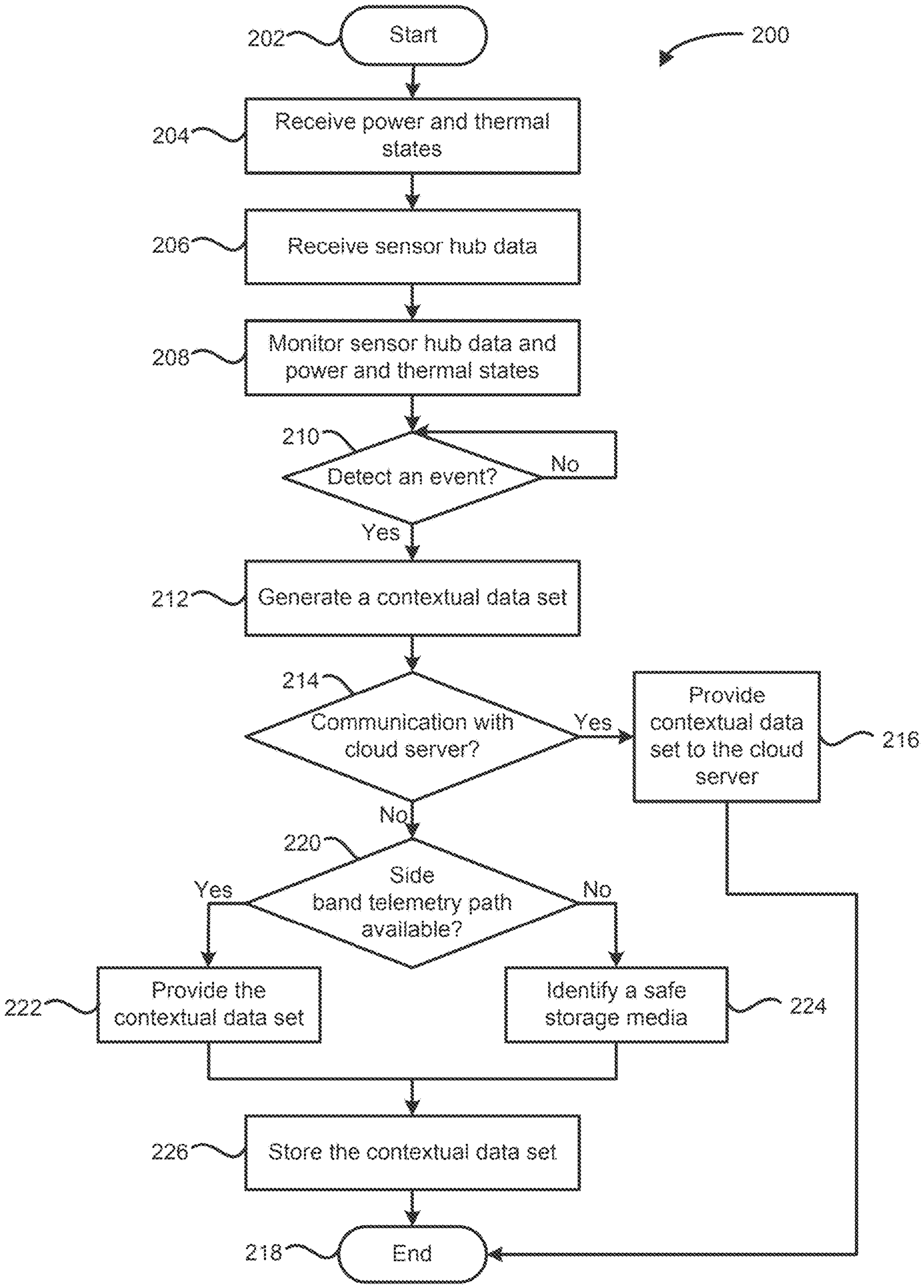
FIG. 2 is a flow diagram of a method for offloading contextual sensing data within an information handling system according to at least one embodiment of the present disclosure.

FIG. 2 shows a method 200 for offloading contextual sensing data within an information handling system according to at least one embodiment of the present disclosure, starting at block 202. Not every method step set forth in this flow diagram is always necessary, and certain steps of the methods may be combined, performed simultaneously, in a different order, or perhaps omitted, without varying from the scope of the disclosure. FIG. 2 may be employed in whole, or in part, processor 114 of information handling system 102 in FIG. 1, or any other type of controller, device, module, processor, or any combination thereof, operable to employ all, or portions of, the method of FIG. 2.

At block 204, power state and thermal state data is received. In an example, these states may be received by the embedded controller from the OS of the information handling system. In certain examples, the power state data may indicate when the information handling system transitions between power states, such as S0, S1-S3, S4, S5, and MODS. The thermal state data may provide updated information on changes to the thermal state of the information handling system.

At block 206, sensing data is received in the embedded controller. In an example, the sensing data may be received from any suitable sources, such as an accelerometer, a gyroscope, a human presence detection component, a sensor hub, or the like. In certain examples, the sensor hub may determine a lid state, whether the information handling system is on a table, whether the information handling system occurred a freefall event, or the like.

At block 208, the sensing data and the power states are monitored. In an example, the embedded controller may monitor the sensing data and the thermal states for different events. For example, the embedded controller may monitor the received power states to determine whether the information handling system has entered into a MODS. When the information handling system has entered into the MODS state, the embedded controller may monitor the sensing data for an event.

At block 210, a determination is made whether an event has been detected. In an example, the event may be any suitable event that may cause an unknown state to occur while the information handling system is in MODS. For example, the event may include, but is not limited to, a shock event and an impact event. When the event is detected, a contextual data set is generated at block 212. In an example, the event detection may occur only when the information handling system in the MODS state because in this power state the event may prevent the information handling system from booting properly.

At block 214, a determination is made whether a side band communication path enables the embedded controller to provide the contextual data set to a cloud server associated with information handling system. In an example, the communication path, if available, may be available over a WWAN, a dock connectivity interface, or the like. If the communication path is available, the contextual data set is provided to the cloud server at block 216 and the flow ends at block 218. The contextual data set may be stored for later usage by an information technology (IT) administrator associated with information handling system to determine a root cause of the boot error.

If the communication path is not available, a determination is made whether another side band communication path is available at block 220. In certain examples, this side band communication path may be between the information and an external device, such as a charger, a dock, or the like. In an example, the side band communication path may be any suitable type, such as CC line of a USB type-C connection. If the side band communication path is available, the contextual data set is provided to the external device at block 222. The external device may include a memory to store the contextual data for later use.

If the side band communication path is not available, a memory within the information handling system is identified at block 224. In an example, the memory may be located at any suitable location within the information handling system that is accessible to the embedded controller. For example, the memory may be a SPI memory external to, but in electrical communication with, the embedded controller. In an example, the memory may be internal to the embedded controller. At block 226, the contextual data set is stored and the flow ends at block 218. In certain examples, the contextual data is either stored in a memory of the external device that is accessible by the side band communication channel or in a memory of the information handling system.

Figure 3:
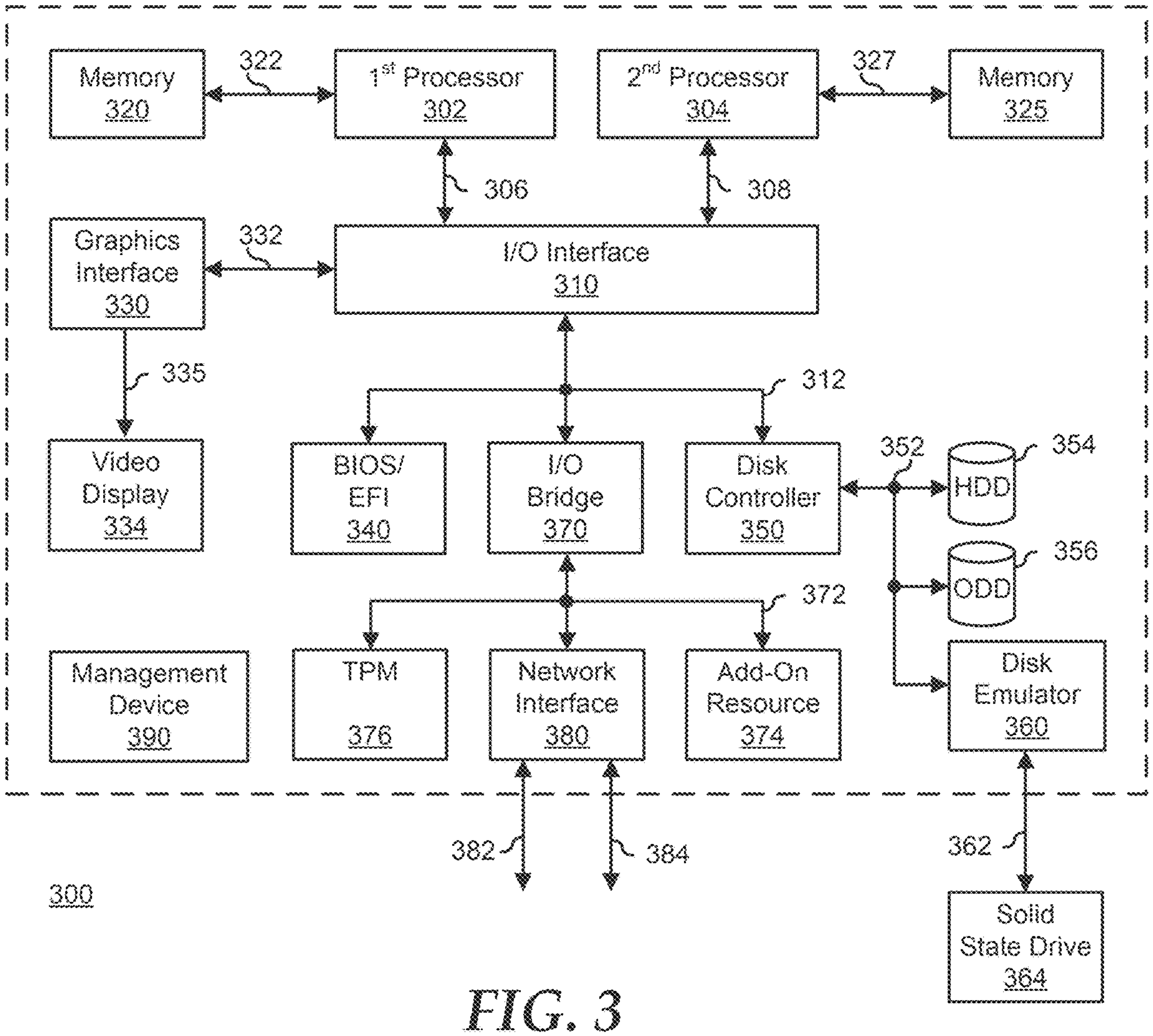
FIG. 3 is a block diagram of a general information handling system according to an embodiment of the present disclosure.

FIG. 3 shows a generalized embodiment of an information handling system 300 according to an embodiment of the present disclosure. Information handling system 300 may be substantially similar to information handling system 102 of FIG. 1. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320, graphics interface 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332 and provides a video display output 336 to a video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 4394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312 or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300.

Management device 390 can operate off of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:

a sensor hub to collect sensing data associated with the information handling system; and an embedded controller to communicate with the sensor hub, while the information handling system is receiving power from an external charger and in a lid-closed state, the embedded controller to:

receive a power state for the information handling system;

receive a trigger event notification from the sensor hub;

in response to the trigger event notification, generate a contextual data set based on a combination of the power state and a trigger event associated with the trigger event notification, wherein the contextual data set includes first data associated with the power state and the sensing data associated with the trigger event; and store the contextual data set, wherein the contextual data set is utilized during a no-post/no-video (NP-NV) event in the information handling system, wherein the contextual data set is stored as a telemetry entry identifying a root cause of the issue.

2. The information handling system of claim 1, wherein the first data associated with the power state is received from an operating system of the information handling system.

3. The information handling system of claim 1, wherein the embedded controller further to:

determine whether a side band communication path is available between the information handling system and an external device; and in response to the side band communication path being available, store the contextual data set in a first memory of the external device.

4. The information handling system of claim 3, wherein the external device is a dock.

5. The information handling system of claim 3, wherein the external device is the external charger.

6. The information handling system of claim 3, wherein in response to the side band communication path not being available, the embedded controller further to: store the contextual data set in a second memory within the information handling system.

7. The information handling system of claim 1, wherein the embedded controller further to: determine a cause of the NP-NV event based on the sensing data and the power state data.

8. The information handling system of claim 1, wherein the embedded controller further comprising:

a plurality of physical sensors to communicate with the sensor hub, wherein the physical sensors provide a notification of a shock event in the information handling system, wherein the embedded controller generates the contextual data set in response to the notification of the shock event being received while the power state indicates that the information handling system is in a modern standby state.

9. A method comprising:

while an information handling system is receiving power from an external charger and in a lid-closed state:

collecting, by a sensor hub of the information handling system, sensing data associated with the information handling system;

receiving, by an embedded controller of the information handling system, a power state for the information handling system;

receiving, by the embedded controller, a trigger event notification from the sensor hub;

in response to the trigger event notification, generating a contextual data set based on a combination of the power state and a trigger event associated with the trigger event notification, wherein the contextual data set includes first data associated with the power state and the sensing data associated with the trigger event; and storing, by the embedded controller, the contextual data set, wherein the contextual data set is utilized during a no-post/no-video (NP-NV) event in the information handling system, wherein the contextual data set is stored as a telemetry entry identifying a root cause of the issue.

10. The method of claim 9, wherein the first data associated with the power state is received from an operating system of the information handling system.

11. The method of claim 9, further comprising:

determining whether a side band communication path is available between the information handling system and an external device; and in response to the side band communication path being available, storing the contextual data set in a memory of the external device.

12. The method of claim 11, wherein the external device is a dock.

13. The method of claim 11, wherein the external device is the external charger.

14. The method of claim 11, wherein in response to the side band communication path not being available, the method further comprises: storing the contextual data set in a memory within the information handling system.

15. The method of claim 9, further comprising: determining a cause of the NP-NV event based on the sensing data and the power state data.

16. The method of claim 9, further comprising:

providing, by a plurality of physical sensors, a notification of a shock event in the information handling system, wherein the contextual data set is generated in response to the notification of the shock event being received while the power state indicates that the information handling system is in a modern standby state.

17. An information handling system comprising:

a plurality of physical sensors to provide a trigger event notification;

a sensor hub to collect sensing data associated with the information handling system and to receive the trigger event notification; and an embedded controller to communicate with the sensor hub, while the information handling system is receiving power from an external charger and in a lid-closed state, the embedded controller to:

receive a power state for the information handling system;

receive the trigger event notification from the sensor hub;

in response to the trigger event notification, generate a contextual data set based on a combination of the power state and a trigger event associated with the trigger event notification, wherein the contextual data set includes first data associated with the power state and the sensing data associated with the trigger event; and determine whether a side band communication path is available between the information handling system and an external device; and in response to the side band communication path being available, store the contextual data set in a first memory of the external device, wherein the contextual data set is utilized during a no-post/no-video (NP-NV) event in the information handling system, wherein the contextual data set is stored as a telemetry entry identifying a root cause of the issue; and in response to the side band communication path not being available, store the contextual data set in a second memory within the information handling system.

18. The information handling system of claim 17, wherein the embedded controller further to: determine a cause of the NP-NV event based on the sensing data and the power state data.

19. The information handling system of claim 17, wherein the external device is a dock.

20. The information handling system of claim 17, wherein the external device is the external charger.

* * * * *